United States Patent [19]
Girard

[11] 3,877,745
[45] Apr. 15, 1975

[54] SUN SHIELD
[76] Inventor: George K. Girard, 108 Rafael Dr., San Rafael, Calif. 94901
[22] Filed: Jan. 22, 1974
[21] Appl. No.: 435,517

[52] U.S. Cl. .............................. 296/97 C; 224/29 A
[51] Int. Cl. .......................................... B60r 11/00
[58] Field of Search ................. 296/97 C; 224/29 A

[56] References Cited
UNITED STATES PATENTS

| | | | |
|---|---|---|---|
| 1,286,352 | 12/1918 | Kubat | 296/97 C X |
| 2,894,576 | 7/1959 | Williams | 296/97 C |
| 2,916,838 | 12/1959 | Campbell | 224/29 A |
| 2,941,839 | 6/1960 | Pendlebury | 296/97 C |
| 3,428,360 | 2/1969 | Honor, Sr. | 296/97 C |
| 3,584,910 | 6/1971 | Lupul | 296/97 C |

Primary Examiner—Robert J. Spar
Assistant Examiner—Donald W. Underwood
Attorney, Agent, or Firm—Lothrop & West

[57] ABSTRACT

For use with an elongated automobile visor there is provided an elongated channel receiving a button slidable in the channel and carrying an eccentrically mounted circular shield plate. In one form of the device, a band having an interlaced fastening and including a spring is provided with end fasteners detachably engaging cooperating sockets in the channel to hold the channel on the visor in a detachable and slidable manner. The button is united by a pin with a turn knob. The pin allows for ready rotation by the user of the circular shield plate.

6 Claims, 6 Drawing Figures

SUN SHIELD

In most automobiles there is customarily provided one or more sun visors. The visor is usually a more or less rectangular plate mounted on a bracket so that the plate can swing about a generally horizontal axis along one side and also can be turned about a generally vertical axis near one end. The difficulty with the arrangement is that sometimes the oncoming light either from the sun or from headlights, is in a location or in an area that cannot be covered by the ordinarily provided visor.

It is therefore an object of the invention to provide a sun shield that can be easily incorporated with the customary visor and can be moved from place to place to cover areas not normally coverable by the visor itself.

Another object of the invention is to provide a sun shield that can be incorporated as a separate element or as an integral element with the ordinary sun visor.

A further object of the invention is to provide a separate sun shield that can easily be applied to automobile visors of varying dimensions and configurations and that can readily be moved to adjusted positions thereon at the will of the user.

A further object of the invention is to provide a sun shield that can easily be attached to and detached from the customary automobile visor.

A further object of the invention is to provide a readily adaptable sun shield that can be positioned within very wide limits and will retain its momentary position until again moved by the user.

Other objects, together with the foregoing, are attained in the embodiment of the invention described in the accompanying description and illustrated in the accompanying drawings, in which.

Figure 1:
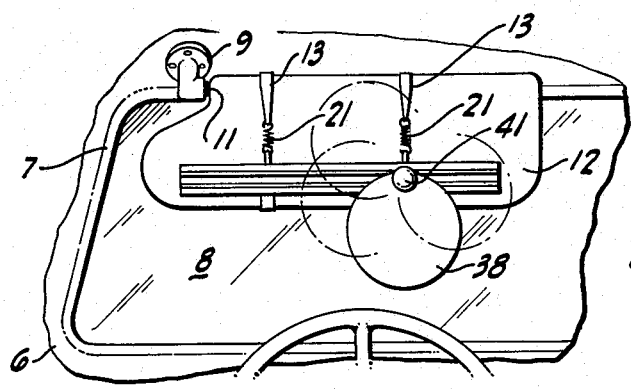
FIG. 1 is a fragmentary view showing, in elevation, an automobile visor with the sun shield of the invention attached thereto in an operating position.
Figure 2:
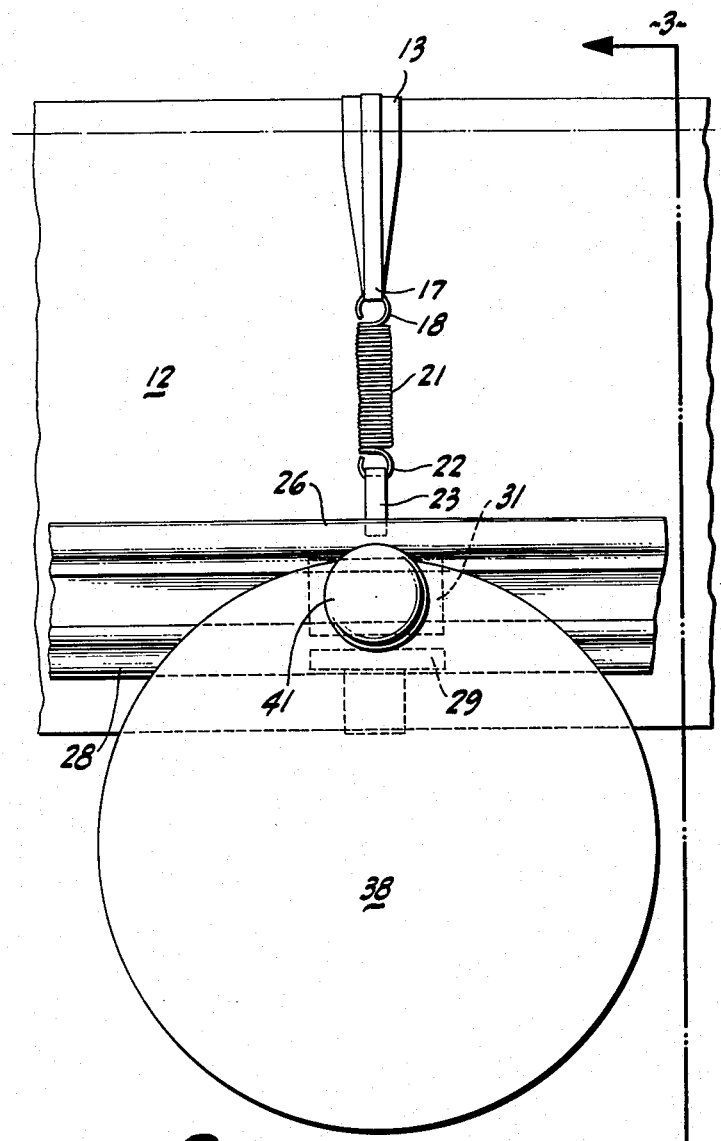
FIG. 2 is an enlarged elevation of the structure shown in FIG. 1, certain parts being omitted to reduce the figure size.

In the customary environment in an automobile 6 there is afforded a windshield frame 7 surrounding a windshield 8. On the frame is a bracket 9 carrying a rod 11 usually rotatable within the bracket about a vertical axis and on which there is mounted a sun visor 12. The visor, as shown herein, is a generally rectangular plate with some variations from strict rectangularity. The visor is a thick or padded member enveloping part of the rod. The visor can be horizontally turned around the rod 11 to a position close to the windshield 8 and to a position lifted away from the windshield and out of the user's line of sight.

Pursuant to the present invention and in one form thereof, there is provided a band 13 or strap of flexible material which, together with its components, is intended to encircle the visor 12. Since visors vary a good deal in dimensions the band 13 conveniently is made with a number of perforations 14 or slots in one portion thereof and with a tongue 16 or end that can easily be inserted into and threaded through various ones of the openings 14, to adjust the length of the encircling band.

Since the band likewise is preferably maintained under some tension, the band between its ends is formed into a loop 17 in the bight of which is disposed an eye 18 of a customary coil spring 21. The other end of the coil spring has a comparable eye 22 to which is secured an end fastener 23. There are flexible jaws 24 on the fastener 23 designed to be received through a slot in a tube 26 fastened permanently to an elongated channel 27. Comparably, the channel 27 on its other side is provided with a slotted tube 28 receiving an enlarged end fastener 29 secured to the strap or band 13.

With this arrangement, the end fastener 29 can be inserted endwise into the slotted tube 28 and the spring 21 can be slightly stretched and the end fastener 23 slightly pinched so that the jaws 24 enter into and engage the slotted tube 26. In this way the channel 27 is positioned on the visor 12 in any desired location along the length thereof and also in any raised or lowered (or rotated) position with respect to the exposed face of the visor. The channel 27, in effect, can be positioned almost anywhere desired over and especially beyond the general area of the visor 12. When so positioned the band and channel remain as located since the tension of the spring is sufficient to insure tight frictional engagement. However, should it be desired to detach the assembly from the visor, either the end fastening 29 can be removed from the slotted tube 28 or the end fastening 23 can be removed from the slotted channel 26. Alternatively, if it is readily accessible, the interthreaded end 16 can be withdrawn from the openings 14.

Figure 4:
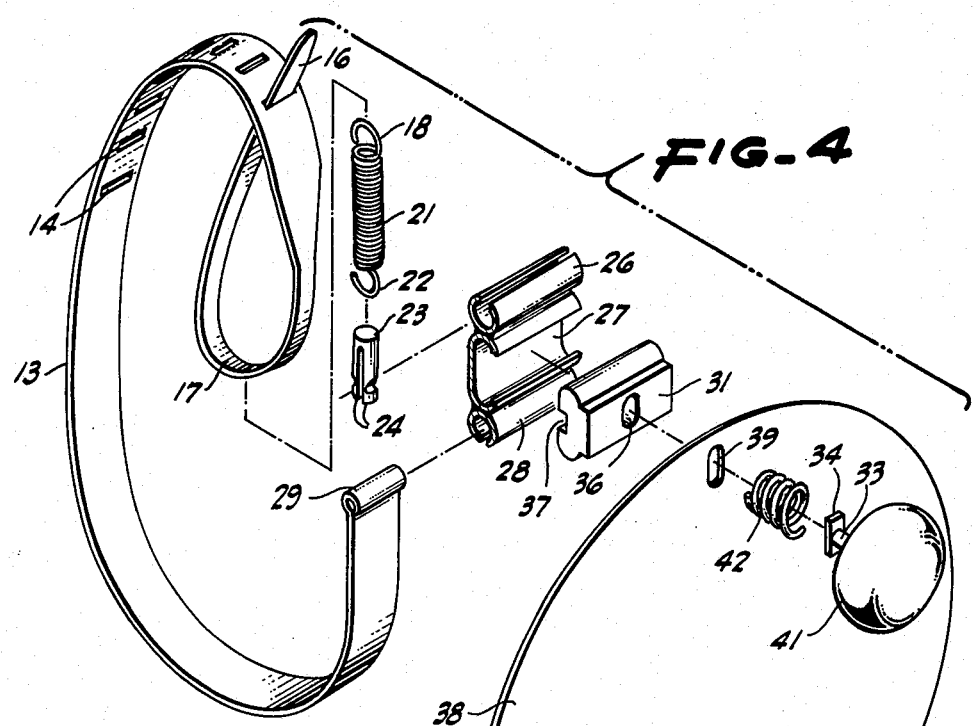
FIG. 4 is an expanded or exploded view of the structure shown in the preceding figures.
Figure 5:
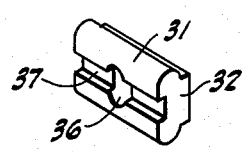
FIG. 5 is an isometric view of one portion of the mounting structure.

When the channel 27 is appropriately positioned it serves as a mounting for a button 31 slidable along the length of the channel. The button, especially as shown in FIGS. 4 and 5, has an elongated boss 32 engageable in the opening of the channel 27 to preclude rotation. In addition, the button receives a through pin 33 having an enlarged rectangular head 34. This can pass through an elongated opening 36 extending through the button. The head is rotatable with the pin so as to be engageable in a cross slot 37 to preclude rotation and withdrawal of the pin 33 from the button.

Overlying the pin 33 is a shield plate 38. This can either be of relatively stiff opaque material or may alternatively be of a reasonably stiff transparent material of a nature to reduce the amount of light passing therethrough. The plate 38 is conveniently a circular disk and is provided eccentrically and near one edge with an opening 39 through which the squared head 34 can go. The plate 38 rests upon the pin 33. Also on the pin is a knob 41 available to the hand of the user and fixed on the pin. When the knob 41 is revolved the head 34 is likewise revolved. By rotating the knob 41 the user can cause the squared portion 34 to reside against rotation in the cross slot 37 or to withdraw through the opening 36.

Figure 3:
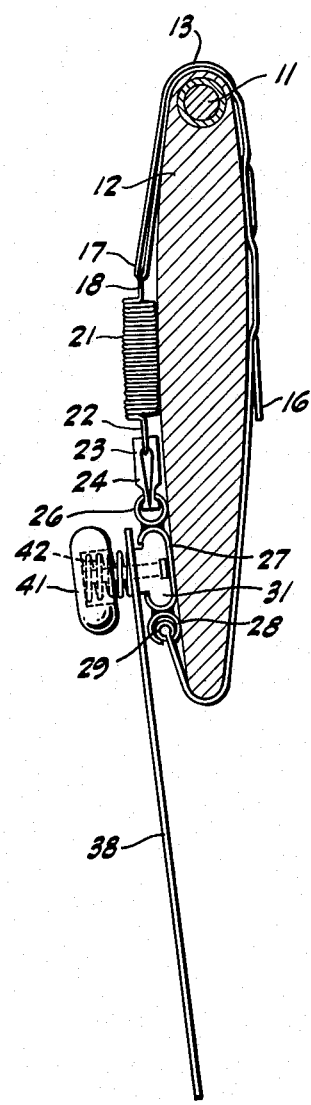
FIG. 3 is, in the main, a cross-section, the plane of which is indicated by the line 3—3 of FIG. 2.

To hold the knob 41 and its associated parts in proper relative relationship and with a friction load on the disk 38, there is provided a helical spring 42 through which the squared portion 34 can go but which abuts the knob 41 and also the disk 38. When the parts are all assembled, as shown in FIG. 3, then the user is afforded a shield plate 38 which can be rotated into any position he likes about the pin 33 as an axis. The shield is held frictionally by the spring 42 against the face of the button 31 until rotated into some other position. Since the strap or band 13 can be moved up and down and crosswise on the visor and since the disk 38 can be rotated with respect to the channel 27, the user can cover any portion of a relatively large area of the windshield 8 in order to protect himself from light shining in, either sunlight or headlight.

Figure 6:
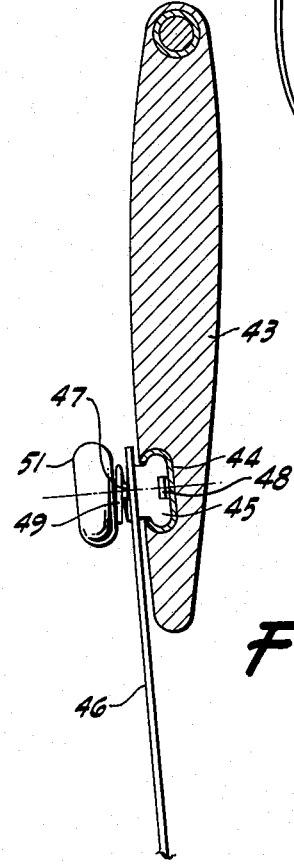
FIG. 6 is a cross-section similar to FIG. 3, but showing a modified form of the automobile sun shield.

As a modification of the foregoing and in the event it is possible to have the visor specially constructed, there is provided an arrangement as shown in FIG. 6. In this case the rod 11, which is the same as before, carries a visor 43, like the visor 12, but having built into it for substantially its entire length a channel 44 open to the outside of the visor and comparable in cross-section to the channel 27. The channel 44 extends longitudinally of the visor far enough so that it is open at least at one end.

Slidable in the channel 44 is a button 45 constructed substantially like the button 31 and having abutting against it a shield plate 46, again preferably of a circular nature, that is eccentrically mounted on the button 45 by a pin 47 comparable to the pin 33. An enlarged end 48, like the end 34, is disposed in the button channel. The parts are held in position by a spring 49 that not only abuts the shield 46 but likewise abuts a knob 51.

In this instance the operation is approximately the same as before except that the visor is especially provided with a channel and the shield plate 44 is not vertically movable with respect to the visor, although it is horizontally movable with respect thereto and can be detached by movement toward at least one end of the channel.

What is claimed is:

1. A sun shield for an automobile visor comprising a support channel, a pair of slotted tubes on and extending along opposite outer sides of said channel, means for mounting said channel on said visor including a band largely encircling said visor and shaped fasteners at the ends of said band and each fitting within and slidable along the slot in a respective one of said tubes, a button slidable in said channel, a shield plate, and means for mounting said shield plate on said button for rotation with respect to said channel.

2. A device as in claim 1 in which said band includes a spring.

3. A device as in claim 1 in which at least one of said shaped fasteners includes flexible jaws engageable with and disengageable from one of said tubes.

4. A device as in claim 1 in which said button is elongated and has an elongated slot therein and including a turn knob and an enlarged pin end; and means including a pin for connecting said turn knob and said enlarged end for movement of said enlarged end into and out of said slot.

5. A device as in claim 1 in which said shield plate is a disc eccentrically mounted on said pin between said turn knob and button.

6. A device as in claim 5 including a spring between said shield plate and said turn knob and surrounding said pin.

* * * * *